United States Patent [19]

Greenberg

[11] Patent Number: 5,569,458
[45] Date of Patent: Oct. 29, 1996

[54] NUTRITIONAL FORMULA

[76] Inventor: Mike Greenberg, 11633 San Vicente Bl. #214, Los Angeles, Calif. 90049

[21] Appl. No.: 306,001

[22] Filed: Sep. 14, 1994

[51] Int. Cl.$^6$ .......................... A61K 35/78; A61K 38/54; A61K 38/44; A61K 38/47

[52] U.S. Cl. ...................... 424/195.1; 424/94.21; 424/94.4; 424/94.61; 424/94.64; 424/451; 514/25; 514/356; 514/458; 514/474; 514/725; 514/731

[58] Field of Search .................. 424/195.1, 94.21, 424/94.4, 94.65, 94.61, 94.64, 451, 600; 514/25, 356, 458, 474, 725, 731

[56] References Cited

U.S. PATENT DOCUMENTS

| | | | |
|---|---|---|---|
| 3,962,416 | 6/1976 | Katzen | 424/19 |
| 4,391,829 | 7/1983 | Spradlin | 426/28 |
| 4,393,085 | 7/1983 | Spradlin | 426/28 |
| 4,737,364 | 4/1988 | Kalogris | 424/195.1 |
| 5,292,538 | 3/1994 | Paul | 426/74 |

OTHER PUBLICATIONS

Finer Things Inc Product Flyer 1992.

*Primary Examiner*—John W. Rollins
*Attorney, Agent, or Firm*—Gene Scott; Patent Law & Venture Group

[57] ABSTRACT

A vitamin and mineral formulation which provides for improved absorption of its nutrients by the addition of digestive enzymes to the formula and including the herb goldenseal to prevent the enzymes from eating up the other nutrients, giving it the capability to retain its value for up to six months. Goldenseal, in conjunction with dandelion and chamomile, also neutralizes the pH of the supplement, thus avoiding a common supplemental problem of widespread ineffectiveness due to large quantities of nutrients being deposited simultaneously into the digestive system. In addition, the formulation of the new invention provides the user with 70 different nutrients, including ginkgo biloba which increases brain alpha rhythms which are associated with mental alertness. Further, the new invention employs an alternate method of construction that does not require high heat or pressure levels, nor the addition of binders or glue like additives.

1 Claim, No Drawings

NUTRITIONAL FORMULA

FIELD OF THE INVENTION

This invention relates generally to vitamin and mineral supplement formulations and more particularly to a capsulated formulation providing digestive enzymes for improved absorption of the nutrients into the body, a special herb to increase blood circulation in the brain, and also a means for balancing the pH of the invention in order to prevent undesired interactions between components in the formulation.

BACKGROUND OF THE INVENTION

Invention and use in the subject area is known to the public. As for example U.S. Pat. No. 4,737,364 entitled Nutritional Dry food Concentrate, by Theodore Kalogris shows a highly nutritional dry food concentrate consisting entirely of plant and other non-animal natural components having a low caloric content and containing no added simple sugars. The nutritional dry food concentrate consisting entirely of natural ingredients is useful as supplement and in a weight reduction program.

Also, U.S. Pat. No. 3,962,416 entitled Preserved Nutrients and Products, by Sol Katzen shows an encapsulation agent and a nutrient are admixed, and then the encapsulating agent is gelatinized polymerized under high pressure and temperature so as to encapsulate the nutrient. The encapsulation allows the nutrient to be kept in a dry stabilized state for a long period of time without the loss of potency. Further, the encapsulation allows the nutrients to be released into the digestive tract after a predetermined amount of time. The digestive tract digests the encapsulating agent thereby freeing the nutrient. Encapsulation is preferably conducted using a heated extruder or expander. The encapsulating agent may be a high protein vegetable composition, such as, wheat flour gluten, a grain flower or carbohydrate flour. The nutrients may be in particulate or liquid form and can be such elements as vitamins, amino acids, lipids, enzymes, and inorganic salts (minerals).

Further, U.S. Pat. No. 5,292,538 entitled Improving Sustained Energy and Anabolic Composition and Method of Making, by Steven M. Paul shows a composition which provides for sustained energy and nutrition to support an anabolic physiological state in humans comprises a blend of simple sugars and more complex carbohydrates, partially hydrolyzed protein, and at least, magnesium in the form of an amino acid chelate. Preferably, the carbohydrate source is a blend of about 5–45% crystalline fructose and 55–95% glucose polymers by weight. Other ingredients, including lipids, bioavailable minerals in the form of amino acid chelates, anabolic nutrients, vitamins, antioxidants, and lipotropic agents may be added as desired to provide an optimal sustained energy and anabolic nutritional formulation. When administered, the carbohydrate blend, protein source, and amino acid chelates facilitate sustained energy and delivery of nutrients to appropriate sites within the body for efficient utilization in anabolic physiology.

In addition, U.S. Pat. No. 4,393,085 entitled Enzyme Digestion for a Dog Food of Improved Palatability by Joseph E. Spradlin provides an improved process for preparing a dog food comprising farinaceous and meaty ingredients. This invention recognizes for the first time that the palatability of dog food can be improved when at least a portion of the farinaceous ingredients are subjected to both an amylase and protease enzyme digestion and intermixing an enzymatically modified proteinaceous material to form a reaction slurry mixture. The resulting combined reaction slurry mixture can be incorporated into the dog food by coating it on the surface or admixing with the other dog food ingredients and thereby incorporating it internally. Preferably, the combined reaction slurry is admixed with the other ingredients to form a plastic mass which is then shaped and expanded by extrusion.

These and many more vitamin and mineral formulations are in common use today. However, the prior art does not teach that the methods of manufacturing the supplements on the market today are actually harmful to the supplement ingredients, counteract the desired effects of the supplement, interfere with the body's uptake of the supplement, or neutralize the supplement. Further, the large number of nutrients arriving into the digestive system simultaneously may cause chemical reactions or competition between the nutrients which would reduce the overall effectiveness of the supplement.

During manufacturing, pressure applied to the nutrient ingredients while forming the supplement into a caplet or tablet causes the ingredients to undergo a sudden temperature rise which renders the ingredients less effective. Nutritional supplement ingredients also undergo grinding which raises the temperature of the ingredients as with tablet formulation discussed above. Further, lubricating additives are used during manufacturing to speed the production of the nutritional supplement and binders are added to help the ingredients stick together during tablet formulation. These binders and additives can simultaneously compete and interfere with nutrient absorption and also introduce contaminants and produce allergies or other negative reactions to the product.

The claim that a vitamin is time released has no merit or value since many of the nutrients are released well beyond that portion of the intestinal tract which accomplishes ingestion of the nutrient into the body's system and are therefore never fully absorbed.

Also, the user of a multivitamin can experience pain, discomfort, symptoms of fluttery post ingestion, and discoloration of the urine due to the practices outlined above. In addition, the body can fail to absorb the nutrient, the nutrients can fall out of balance with respect to each other because of the addition of binders, and the multivitamin may undergo incomplete supplementation.

The present invention does not suffer from the drawbacks described above and provides further advantages in its nutrient composition that have never yet been available in a tablet or capsule form. Further advantages of the present invention will become evident.

SUMMARY OF THE INVENTION

The present invention is a formulation of vitamins, minerals, and herbs which are synergistically proportioned to enhance absorption into the body. In this formulation three of the capsules contain the following ingredients:

|  |  | % U.S. RDA |
|---|---|---|
| Beta-Carotene (Vitamin A Activity) | 5190 I.U. | *** |
| Vitamin A (Palmitate, Water Dispersible) | 1730 I.U. | 35 |
| Vitamin D-3 | 17.3 I.U. | 4 |
| Vitamin E (d-alpha Tocopheryl Succinate) | 69.2 I.U. | 231 |

-continued

| | | % U.S. RDA |
|---|---|---|
| Vitamin C (Ascorbic Acid, Corn Free) | 346 mg. | 577 |
| Vitamin B-1 (Thiamine HCL) | 17.3 mg. | 1153 |
| Vitamin B-2 (Riboflavin) | 8.65 mg. | 509 |
| Niacin | 6.92 mg. | 35 |
| Niacinamide | 34.6 mg. | 173 |
| Pantothenic Acid (d-Calcium Pantothenate) | 51.9 mg. | 519 |
| Vitamin B-6 (Pyridoxine HCL/ Pyridoxal-5-Phosphate Complex) | 8.65 mg. | 433 |
| Vitamin B-12 (on Ion Exchange Resin) | 34.6 mcg. | 577 |
| Folic Acid | 276.8 mcg. | 69 |
| Biotin | 103.8 mcg. | 35 |
| Choline Citrate/Bitartrate | 17.3 mg. | *** |
| Inositol | 8.65 mg. | *** |
| Citrus Bioflavonoid Complex | 34.6 mg. | *** |
| PABA (Para-Aminobenzoic Acid) | 17.3 mg. | *** |
| Calcium (Citrate & Ascorbate Complex) | 103.8 mg. | 10 |
| Magnesium (Aspartate Complex) | 103.8 mg. | 26 |
| Potassium (Aspartate Complex) | 26 mg. | *** |
| Copper (Amino Acid Chelate) | 13.9 mcg. | 1 |
| Iron (Amino Acid Chelate) | 0.14 mg. | 1 |
| Zinc (Aspartate Complex) | 6.92 mg. | 46 |
| Manganese (Aspartate Complex) | 5.2 mg. | *** |
| Chromium GTF (Organically bound with GTF activity - Low Allergenicity) | 69.2 mcg. | *** |
| Selinium (Antino Acid Complex) | 69.2 mcg. | *** |
| Molybdenum (Amino Acid Complex) | 17.3 mcg. | *** |
| Vanadium (Amino Acid Complex) | 8.65 mcg. | *** |
| Boron (Aspartate/Citrate Complex) | 0.35 mg. | *** |
| Trace Elements (Sea Vegitation) | 34.6 mcg. | *** |

In a 138 mg. synergistically balanced and formulated base of Pancreatin 8× (providing Protease, Amylase and Lipase), Pancreatin 4× (providing Protease, Amylase and Lipase), Bromelain (minimum 500 m.c.u.), Bromelain (minimum 2000 m.c.u.), Papain, Cellulase, Lactase, Lactobacillus Acidophilus, Golden Seal Root, Dandelion Root, Chamomile, Chymotrypsin, Trypsin, Chondroitin Sulfate, L-Aspartic Acid, Proanthocyanidins (Red Wine Grapes), Microcrystalline Hydroxyapatatite, Mucopolysaccharides, Rutin, Capsicum, Ginko Biloba Extract (minimum 24% ginkgoflavonglycosides and 6% terpenes), Silymarin (from Silybum Marianum), Coenzyme 0–10, Lemon Bioflavonoid Complex, SOD/Glutathione Peroxidase (Young Wheat Sprouts), L-Glutathione (reduced), Brown Rice Protein Concentrate (hydrolized, digestability 96%), DL-Phenylalanine, N-Acetyl-L-Cysteine/L-Cysteine HCL, DL-Methionine, Betaine HCL/Glutamic Acid HCL, L-Glycine and L-Glutamine.

The instant formulation contains no yeast, soy, corn, dairy products, salt, sugar, artificial coloring, preservatives, or flavoring. Suggested usage as a dietary supplement for adults is one capsule, three times daily.

It is an object of the invention to provide a supplement that is created without great pressure and heat and without additives, binders or other such substances that decrease the effectiveness of the nutrients. It is an object of the invention to acheive a formulation that is biochemically balanced in such a way that all of the included nutrients are able to be broken down and absorbed by the body during digestion.

Another object of the new invention is to introduce a supplement that utilizes digestive enzymes to aid in increased absortion of the nutrients. Yet another object of the new invention is to provide an herb, namely goldenseal, that will prevent these enzymes from eating up the other nutrients, neutralize the pH of the supplement so that the nutrients are all utilized to their fullest potential and still further provide a buffer to prevent user discomfort from digesting a large number of nutrients at once.

Yet another objective is to introduce an herb, ginkgo biloba, to increase the flow of blood to the brain, thus increasing brain alpha rythyms.

It is a further object of the invention to improve upon the standard configuration of base nutrients that is common to most supplements and avoid negative reactions caused by excesses of certain minerals. Hence, it is the object of the invention to provide a dietary supplement that surpasses the RDA guidelines in some instances and undercuts them in others, providing a proper ratio of nutrients that will be used to the fullest benefit of the user.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The present invention is a dietary supplement formulation comprising a plurality of cellular nutrients for enhancing human nutrition. The key components that make this invention an improvement upon all prior art are: at least one herb for increasing blood circulation in the brain, at least one digestive enzyme for providing improved metabolization of nutrients and at least one substance for balancing the chemical pH of the formulation.

The addition of the herbal remedy, ginko biloba, provides unique benefits to users of the new invention. According to Dr. Hans Kugler, Ph.D., in *Life Extenders and Memory Boosters*, although little known or used in the United States, over ten million prescriptions are written annually for ginko biloba throughout the world. This herb increases circulation to the brain by increasing blood flow through the capillaries that are farthest from the heart, enhances the brain's ability to metabolize glucose and increases nerve transmission. In a double-blind study in which EEG monitors were used, it was shown that ginkgo extracts increase brain alpha rhythms, which are associated with mental alertness. In addition, ginkgo biloba has many compounds with therapeutic benefits such as countering depression, cardio-vascular propels, senility and impotence.

To remedy a common dietary supplement problem of low absorbability of the nutrients, the new invention includes digestive enzymes which aid in the absorption of the vitamin, thereby optimizing the bioavailability of the nutrients. Further, as detailed in *Prescription for Nutritional Healing* by James and Phyllis Balch, M.D., C.N.C., pp 34–35, these enzymes promote the detoxification of cellular metabolism and aid in the elimination of toxins by the colon, kidneys, lungs and skin. Thus, while supplying optimal nutrition for the cells, the new invention also helps clean the cells for further good health benefits. The enzyme formula, based on current scientific knowledge of nutrients in their interaction and accumulative effect, features bromelain (minimum 2500 m.c.u.) as the chief enzyme to optimize bioavailability of all nutrients; with pancreatin, papain, cellulase, lactase, betain, HCL/glutamic acid HCL, 1-cysteine HCL, chymotrypsin, trypsin, and rutin working synergistically. To date, enzymes have not previously been included in vitamin supplements. The reason commercial companies choose not to use digestive enzymes in the supplements is due to the current thought that the enzymes will eat up the nutrients, thus lessening the shelf life of the product. However, the new invention discovers and recognizes that although the addition of enzymes to its formula may not increase its long-term marketability, the formula's increased absorbability of its nutrients greatly increases the effectivity and performance of the invention. Therefore the new invention uses the goldenseal herb to allow the digestive enzymes to co-exist with the other nutrients in the formulation for a shelf life of up to six months.

The new invention is also formulated to combat the problem of overall ineffectiveness faced by most current supplements. Due to chemical reactions and competition between nutrients, the overall effectiveness of most supplements is drastically reduced when dozens of vitamins and minerals simultaneously arrive in the digestive system. The new invention avoids this pitfall by balancing the pH and choosing ingredients that do not negatively interact. This pH neutralization is accomplished by using synergistic ratios between nutrients and introducing dandelion, chamomile and goldenseal herbs. Besides neutralizing the pH of the new invention, these herbs also provide other special benefits. For example, since ancient times dandelion has been used to help treat colds, bronchitis, pneumonia, hepatitis, boils, ulcers and obesity by cleansing the bloodstream and liver and increasing the production of bile (Kugler p. 132). Chamomile is a good nerve tonic, sleep aid, appetite stimulant and digestive aid that also relieves pain, muscle cramps, headaches and fever (Balch p. 50) while goldenseal is a bitter, cure-all type herb that generally strengthens the immune system, acts as an antibiotic, potentiates insulin and cleanses the body (Balch p. 52). Goldenseal is further utilized in supplying a nurturing post-ingestion feeling, thus eliminating any user discomfort or irritation from the supplement.

In addition to providing these unique features, the present invention also improves upon the standard base formula to which most supplements adhere. While this common base formula is designed to conform to the guidelines of the RDA, it is not formulated to provide optimum health benefits, as the RDA guidelines delineate merely the minimum values needed for good health. The standard base includes nutrients in improper ratios for effective use, thus leading to an overdose of some nutrients. To deal with this overdose the body may often deplete vital nutrients already owned by the body. Thus, nutrients in supplements must be biochemically balanced, not just lumped together to meet the RDA standards. The present invention accomplishes this by adjusting the nutrient levels recommended by the RDA, raising some and lowering others.

The new invention utilizes 70 different components to provide increased energy, digestive support, osteo-support and maximum cellular nutrition while helping combat executive stress. This is more than double the number of nutrients found in commercial brands. Some of these nutrients include L-glycine, L-glutamine, and chamomile for improved nutrition for the musculoskeletal system. The formulation further includes at least one anti-oxidant taken from the group of anti-oxidants including beta-carotene, vitamin B-6, vitamin C, pantothenic acid, selenium, vitamin E, zinc, L-glutathine, DL-methioniene, SOD glutathine peroxidase, coenzyme Q-10, silymarin and proanthocyanidin. These anti-oxidants aid the body in fighting the formation of free radicals, which can cause cell damage, which in turn impairs the immune system and leads to infections and various degenerative diseases (Balch p. 32). Citrus bioflavonoid complex and lemon bioflavonoid complex are included to enhance the absorption of vitamin C (Balch p. 10) while lactobacillus acidophilus is added to further aid in the digestion of proteins and help detoxify harmful substances (Balch p. 37).

The new invention is created by a cold press method for granulating the ingredients into an ultra-fine uncompressed powder which is then encapsulated. This system eliminates the problems found in the creation of standard supplements, namely, the standard high pressure means of crushing nutrients resulting in a heat flash that damages the quality and effectiveness of the nutrients.

Additionally, the present invention does not utilize any additives, while current prior art includes lubricating additives to speed the production process and binders and other glue-like additives to help nutrients stick together in tablets. Since vitamins and minerals can only be absorbed in the first part of the digestive system, these additives can further deteriorate the value of such supplements by making it difficult for the body to dissolve the glued together granules in sufficient time for absorption to occur.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. In a capsule sized dietary supplement formulation comprising:

at least one herb mixed into the nutrition formulation, and capable of increasing the rate of blood flow in the human body, the at least one herb being ginko biloba or capsicum; and at least one digestive enzyme mixed into the nutrition formulation, and capable of increasing the rate of metabolization of the nutrition formulation in the human body, the at least one digestive enzyme being bromelain, pancreatin, papain, cellulase, lactase, chymotrypsin, or trypsin; and at least one substance mixed into the nutrition formulation, and capable of balancing the chemical pH of the formulation as mixed with the at least one herb, and the at least one digestive enzyme, the at least one substance being goldenseal, dandelion or chamomile;

the at least one herb, at least one digestive enzyme, and the at least one pH balancing substance, together, making up not more than approximately 10% of the weight of the nutrition formulation.

\* \* \* \* \*